United States Patent [19]

Nordin et al.

[11] Patent Number: 4,522,669

[45] Date of Patent: Jun. 11, 1985

[54] COMBINATION MOULD PORTION AND PROTECTIVE ELEMENT FOR PIPE

[75] Inventors: Olof Nordin; Sören Forsberg, both of Värnamo, Sweden

[73] Assignee: Forsheda AB, Forsheda, Sweden

[21] Appl. No.: 413,823

[22] Filed: Sep. 1, 1982

[30] Foreign Application Priority Data

Sep. 4, 1981 [SE] Sweden ................ 8105254

[51] Int. Cl.³ ............. B29D 27/00; B65H 69/02; B29C 17/02; B28B 7/20
[52] U.S. Cl. ........................ 156/157; 156/158; 156/218; 156/502; 156/503; 249/127; 249/183; 249/89; 249/100; 264/152; 264/157; 264/256; 264/271.1; 264/285; 264/321; 264/333; 264/DIG. 4; 425/127
[58] Field of Search ............. 264/46.9, 177 R, 157, 264/158, 152, DIG. 4, 321, 285; 156/502, 217, 134, 136, 422; 285/137 R; 249/89, 100, 127, 183; 425/127

[56] References Cited

U.S. PATENT DOCUMENTS

| | | | |
|---|---|---|---|
| Re. 31,353 | 8/1983 | Cheung | 156/502 X |
| 1,918,496 | 7/1933 | Tarter et al. | 156/217 X |
| 1,981,893 | 11/1934 | Abbott, Jr. | 156/136 X |
| 2,110,303 | 3/1938 | Marshall | 156/217 X |
| 2,153,414 | 4/1939 | Dodge | 264/152 |
| 2,677,747 | 5/1954 | Jaye | 264/158 X |
| 2,694,436 | 11/1954 | Pettit | 156/502 |
| 2,728,104 | 12/1955 | Fisch | 264/177 R |
| 2,813,053 | 11/1957 | Tuomala | 264/DIG. 4 |
| 3,026,569 | 3/1962 | Keller | 264/152 X |
| 3,117,902 | 1/1964 | Holzheimer | 156/217 |
| 3,139,469 | 6/1964 | Miller | 249/100 X |
| 3,207,827 | 9/1965 | Kuehnle | 264/177 R X |
| 3,218,211 | 11/1965 | Taylor et al. | 156/217 |
| 3,330,187 | 7/1967 | Kohler et al. | 264/177 R X |
| 3,356,778 | 12/1967 | Anderson | 264/46.9 X |
| 3,484,513 | 12/1969 | Paoli | 264/177 R X |
| 3,555,137 | 1/1971 | Carmody | 264/157 X |
| 3,801,406 | 4/1974 | Debenedetti | 264/157 X |
| 4,007,941 | 2/1977 | Stancati | 285/137 R X |
| 4,050,975 | 9/1977 | Draffone | 156/217 |
| 4,073,048 | 2/1978 | Ditcher | 264/46.9 X |
| 4,168,336 | 9/1979 | Waite et al. | 156/422 X |
| 4,242,164 | 12/1980 | Skinner | 264/177 R X |

Primary Examiner—Philip Anderson
Attorney, Agent, or Firm—Lowe, King, Price & Becker

[57] ABSTRACT

A mould portion and/or protective element of the type consisting of a material subjected to deformation is disclosed. A method and a device for manufacturing such a mould portion and/or protective element are also disclosed.

The mould portion and/or protective element is preferably intended to be used as a mould portion in moulding an article and/or as a protective element to prevent access of soil and water to a surface portion of the article during transportation and storage thereof.

Such materials subjected to dimensional changes as can be used as mould portions and/or protective elements present the advantages of being inexpensive and permitting removal of the article without difficulty. One such material is for example cellular plastics. The dimensional changes, however, have entailed so great difficulties in using mould portions and/or protective elements of such materials that they have made the use of the material impossible.

To eliminate the above mentioned disadvantage the mould portion and/or protective element of a material subjected to dimensional changes is manufactured with the desired dimensions, starting from at least one blank, immediately before the mould portion and/or protective element is used to mould the article or join the mould portion and/or protective element to the article to protect the surface portion thereof. Alternatively, the mould portion and/or protective element of a material subjected to dimensional changes is manufactured with the desired dimensions, starting from at least one blank after the blank has reached dimensional stability.

26 Claims, 7 Drawing Figures

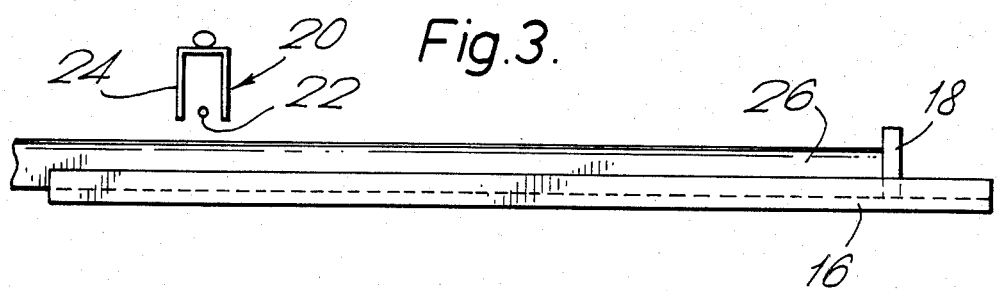
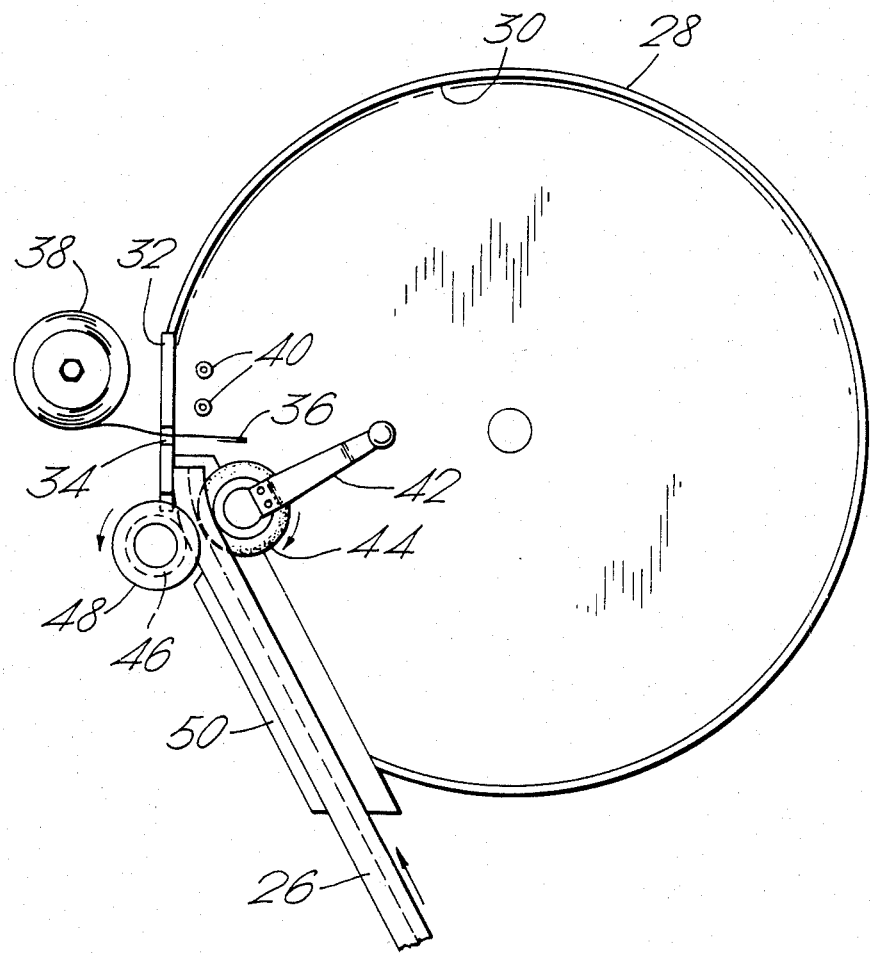

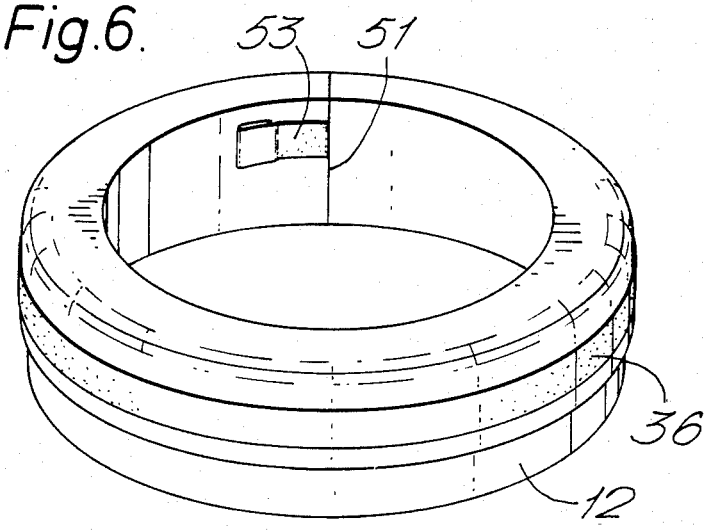
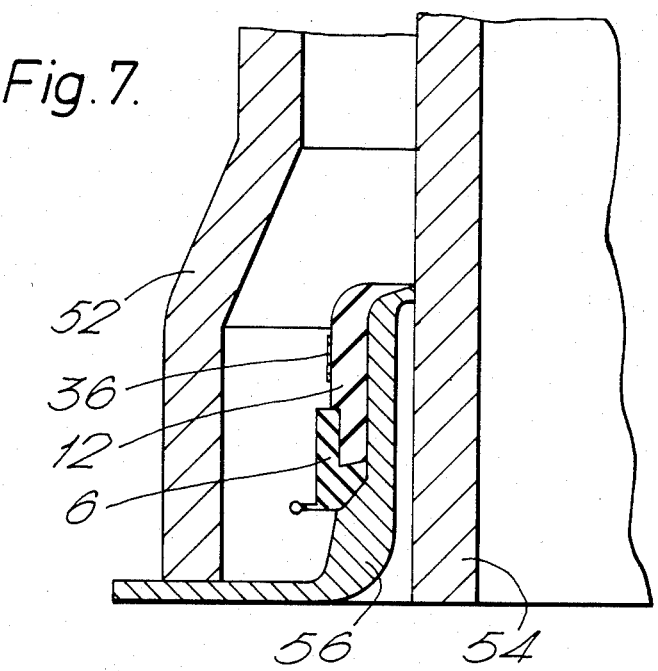

COMBINATION MOULD PORTION AND PROTECTIVE ELEMENT FOR PIPE

The present invention relates to a mould portion and/or protective element formed from a material subjected to deformation used to assist in moulding pipe sections and protecting surfaces thereof, as well as to a method and a device for manufacturing the mould portion/protective element.

To manufacture an article, such as concrete pipe, using moulding methods is previously known to make use of a separate mould portion of a material allowing the mould portion to be removed after the article has hardened even when the mould portion has been utilized to shape an undercut space in the article. Such a mould portion can also be used as a protective element to prevent access of soil and water to a surface portion of the article during transportation and storage thereof. It is thus previously known to leave a mould portion of the type described about in the article as moulded until the article is to be used. Combined mould portions and protective elements of this type are thus intended for single use, meaning that they have to be made from inexpensive material to keep the costs for the use of such combined mould portions and protective elements low. Where the aforesaid mould portions and protective elements are removed only at the place of use, it is also required that these portions and elements consist of a material that can easily be removed.

Particularly when moulding concrete pipes having sealing surfaces for sealing connection between the two installed pipes, it has proved advantageous to use combined mould portions and protective elements of the type described above since with pipes of this type the problem arises that the sealing surfaces during transportation and outdoor storage are subjected to soiling and icing. Thus, if the joint sealing surfaces are not cleaned before joining the pipes, connection is difficult, or even impossible, and the resulting joint may leak. Previously known protective elements for the joint sealing surfaces which have required tolerances in order to provide close engagement with the sealing surfaces and at the same time are simple to mount, are costly. The problem is made even more difficult to solve at an acceptable cost by the relatively wide manufacturing tolerances of especially concrete pipes.

A combination mould portion and/or protective element manufactured of cellular plastics, such as styrene cellular plastics, satisfies the two requirements of low cost manufacture and easy removal from the article. However, a great disadvantage inherent in cellular plastics is that it is subjected to large dimensional changes, which has hitherto resulted in difficulties in using mould portions and/or protective elements of this material. Wide manufacturing tolerances of the mould portions and/or protective elements entail not only difficulties of providing a satisfactory protection of the joint sealing surfaces during transportation and storage, but also difficulties in the moulding operation proper because the concrete when poured into the mould may penetrate between the mould portion and/or protective element and a supporting surface supporting the portion and/or element in the mould if there is no tight connection between the mould portion and/or protective element and the supporting surface.

According to one aspect of the invention there is provided a mould portion and/or protective element which can be manufactured of a material subjected to dimensional changes, for example a material so inexpensive and so readily removable from the article as cellular plastics, without giving rise to the above mentioned disadvantages and difficulties.

The mould portion and/or protective element according to the invention is manufactured with the desired dimensions, starting from at least one blank, immediately before it is used for moulding the article or joined to the article to protect the surface portion thereof, and/or after the blank has reached dimensional stability.

According to another aspect of the invention there is provided a method of and device for manufacturing a mould portion and/or protective element of a material subjected to dimensional changes.

In a preferred embodiment of the invention the blank is an elongate profiled strip which for manufacturing the mould portion and/or protective element is cut to the predetermined length and imparted annular shape. The profiled strip cut to the predetermined length and given annular shape may be peripherally closed with a strip shaped element which may for example be a tape.

It is also possible to manufacture a mould portion and/or protective element from two semicircular blanks which are cut at their end portions in order together to form the annular mould portion and/or protective element of the desired dimensions and then to put together the semicircular blanks to form said mould portion and/or protective element.

Accordingly, in a preferred embodiment the mould portion and or protective element is a ring slit at one or more points and kept together by a strip-shaped element.

A mould portion and/or protective element of a material subjected to dimensional changes can be manufactured, according to the invention, with so exact dimensions that when brought into engagement with a predetermined engagement surface, it undergoes a small elastic deformation so as to engage fixedly with the engagement surface. Said engagement surface may for example be a supporting surface in a mould for manufacturing an article or a sealing surface to be protected during the transportation and storage of the article.

According to a further aspect of the invention there is provided a device for manufacturing a mould portion and/or protective element of a material subjected to dimensional changes by the above described method, said device including a device for shaping a blank into a mould portion and/or protective element the desired dimensions.

The device for manufacturing the mould portion and/or protective element may also include a cutting device for cutting a blank formed by an elongate profiled strip, and the shaping device may include an annular shaping element and a drive for driving a blank formed by a cut, elongate profile strip into and around the inner periphery of the shaping element.

An embodiment of the invention will now be described by way of example with reference to the accompanying drawings, wherein:

FIG. 3 is a diagrammatic view of a cutting device for cutting the blank shown in FIG. 2 to the desired length;

FIG. 4 is a diagrammatic top plan view of a shaping device for imparting the desired annular shape to the cut blank, FIG. 4 illustrating the initial stage of the shaping operation;

FIG. 6 is a perspective view of a mould portion and/or protective element according to the invention; and FIG. 7 illustrates the use of the mould and/or protective element according to the invention when moulding a concrete pipe.

FIG. 8 is a mould portion and/or a protective element formed from two semicircular blanks.

Figure 1:
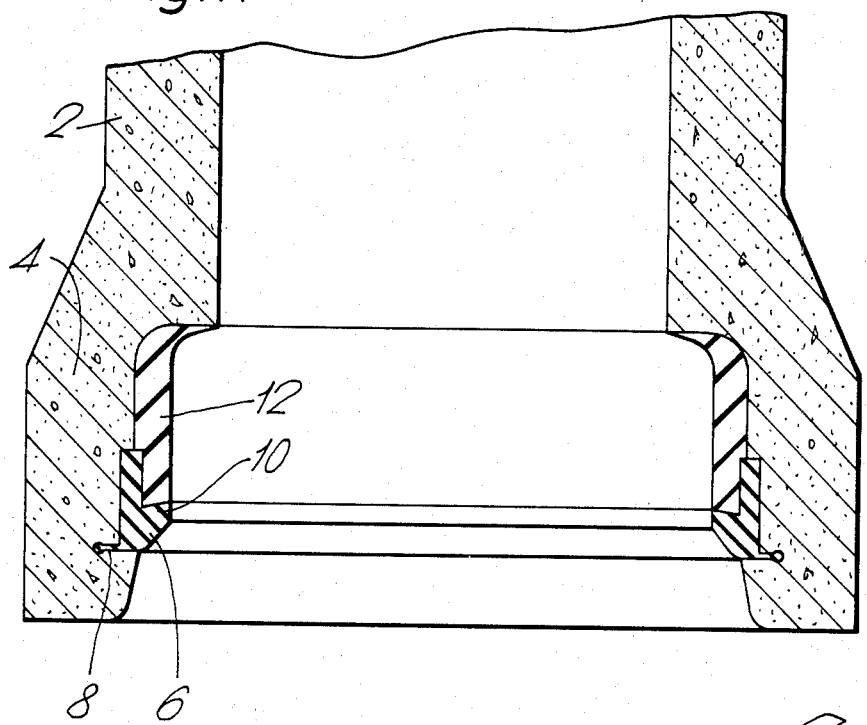
FIG. 1 is an axial sectional view of pipe section in which a mould portion and protective element is included.

FIG. 1 shows an end portion of a pipe section, more particularly a socket portion 4 of a concrete pipe 2. Socket section 4 at an inner surface thereof has a sealing ring 6 of rubber elastic material having a fastening portion 8 partly embedded in the pipe material and an inwardly radially projecting sealing portion 10.

A mould portion and/or protective element 12 of the invention sealingly contacts both the surface portions of ring 6 located axially inwardly from sealing portion 10 as well as the inner surface of socket portion 4 located axially inwardly from the sealing ring. During storage and transportation of pipe section 2, mould portion and/or protective element 12 protects protective elements low. Where the aforesaid mould portions and protective elements there often occurs heavy soiling and icing at the surface portions in question requiring that the pipe be cleaned before joined with another pipe. For if no such cleaning is effected the joining of the pipes can only be performed with difficulty or not at all, and besides the tightness of the joint may be jeopardized. It will be appreciated that mould portion and/or protective element 12 remains in the pipe until the pipe is to be joined with another pipe by insertion of the spigot end of the latter pipe into socket portion 4. In order that the mould portion and/or protective element 12 shall safely remain in the pipe during transportation and storage but nevertheless be readily removable when the pipe is to be joined with another pipe, the mould portion and/or protective element must be a readily removable material that can be manufactured at low cost for single or one time use. A material possessing such properties is preferably a styrene cellular plastic which is manufactured by moulding expanded granules in closed moulds where the material by steam treatment is sintered together to a coherent cellular mass. However, the problem arises that the styrene cellular plastic is a material subjected to dimensional changes. A mould portion and/or protective element manufactured some time prior to placement within pipe section 2 thus has another dimension different from the intended one, which is of course disadvantageous where small tolerances are critical to satisfy the requisite tightness requirements.

To eliminate the aforesaid difficulties the mould portion and/or protective element 12 is manufactured in the manner described herein below with reference to FIGS. 2-5.

Figure 2:
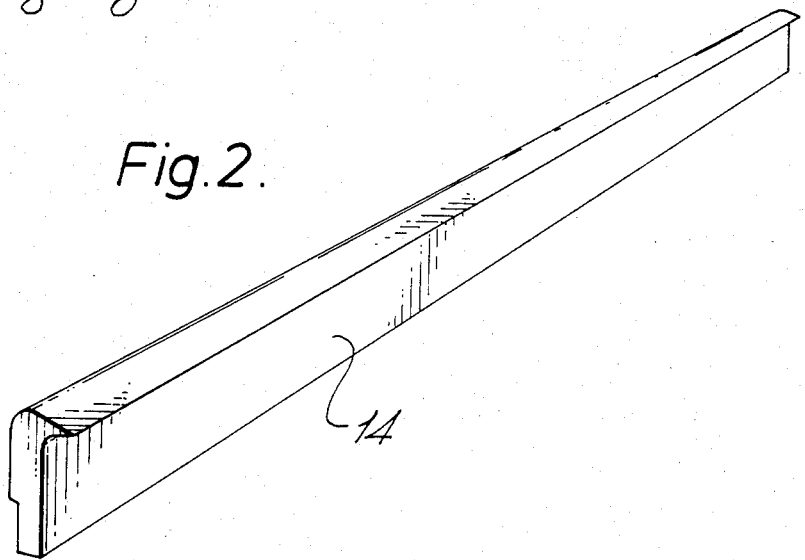
FIG. 2 is a perspective view of a blank for manufacturing a mould poriton and protective element according to the invention.
Figure 5:
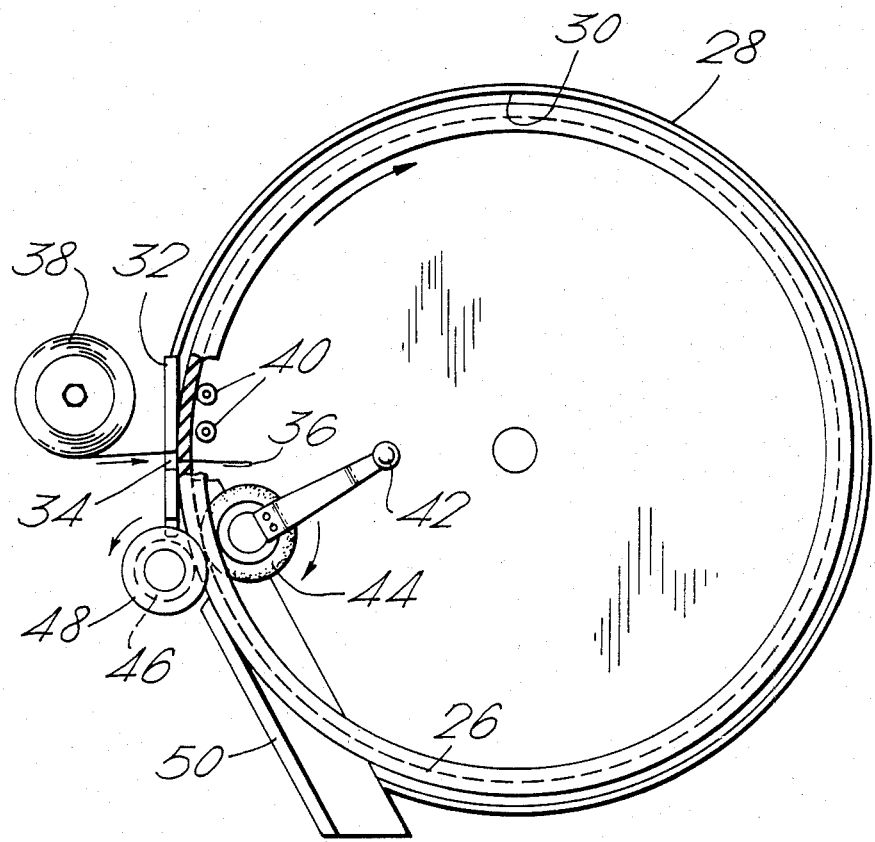
FIG. 5 is a view corresponding to FIG. 4 and illustrating a final stage of the shaping operation.

FIG. 2 shows a blank 14 cut into a profile strip 26 of desired length for manufacturing a mould portion and/or protective element 12 by the method according to the invention. The blank 14 is in the shape of a substantially straight profile strip of greater length than the length required to impart the desired diameter to the mould portion and/or protective element 12. Blank 14 is cut in a cutting device diagrammatically illustrated in FIG. 3 to the correct length to obtain to the desired diameter. The cutting device includes a channel 16 in which blank 14 is placed with an end surface thereof positioned against an abutment 18. The abutment 18 has been adjusted beforehand at a desired distance from a cutting element 20 which includes a heatable wire 22 secured in a pivotally mounted holder 24. When blank 14 has thus been placed in channel 16 with one end surface placed against abutment 18, holder 24 pivots downwardly so that heated wire 22 through the cellular plastics material of the blank 14 resulting in a profile strip 26 of the desired length.

FIG. 4 shows a shaping device for imparting annular shape to profile strip 26, as seen from above. The shaping device includes an annular shaping element 28 the inner periphery of which constitutes a shaping guide and surface 30. A guide bar 32 tangentially closely follows annular shaping element 28 and is provided with a recess 34. Recess 34 allows a tape strip 36 from a roll of tape 38 to be moved through guide bar 32 in a manner to be described in greater detail below. Rotatably mounted guide rollers 40 are provided opposite guide bar 32 at a distance adjusted to the width of profile strip 26. The shaping device further includes a rotatably mounted drive roller 44 provided with a crank 42. Opposite the drive roller there is provided a rotatably mounted supporting wheel 46 having an upper disk-shaped portion 48 which is meant to engage the upper surface of the profile strip 26. The supporting wheel 46 is urged towards drive roller 44 by a spring (not shown). A guide bar 50 is provided in connection with drive roller 44 and supporting wheel 46 to guide profile strip 26 placed on the guide bar between the drive roller 44 and supporting wheel 46.

FIG. 4 further illustrates the initial stage of the operation for imparting annular shape to profile strip 26. The tape strip 36 has been pulled through recess 34 in guide bar 32 and has been provided at its ends with a double folded portion. The profile strip 26 is placed on the guide bar 50 and pushed in between the drive roller 44 and the supporting wheel 46 simultaneously as crank 42 is actuated to drive the drive roller 44 clockwise. By spring load of the supporting wheel 46 against the drive roller the latter will by friction against profile strip 26 drive the strip forward towards guide bar 32. When the front end of profile strip 26 meets tape 36 the tape surface thereof which is coated with adhesive will adhere to the outer surface of the profile strip so that the tape at the inner side of the profile strip forms a gripping portion and at the outer side of the profile strip forms a coherent band around it.

When the front end of profile strip 26 contacts guide bar 32 the front portion of the strip is bent and guided inwardly towards the shaping surface 30 under the action of guide rollers 40. Guide rollers 40 positively guide profile strip 26 which is thereby prevented from taking a wrong position. Drive roller 44 is continuously actuated to drive the entire profile strip 26 into the annular shaping element 28 so that the strip form the annular mould portion and/or protective element of the invention. When the entire strip 26 has been driven into annular shaping element 28 the ends of the strip meet, the position illustrated in FIG. 5 thus having been reached. Since drive roller 44 is positioned ahead or upstream of recess 34" in relation to the direction of motion of profiled strip 26 (i.e. the place where the tape is supplied), the ends of the profiled strip will be pressed tightly together so that there does not arise any gap in the joint formed. The shaped strip 26 will be driven by the drive roller 44 somewhat further than the position shown in FIG. 5 in order that the tape 36 shall overlap by at least 100 mm at the joining point. After this position has been reached, tape 36 is cut by means of some cutting device (not shown) and supporting wheel 46 is moved away from driver roller 44. Then the mould portion and/or protective element formed by the profile strip 26 can be removed by being pulled in an upward direction from the shaping device.

As the mould portion and/or protective element can be manufactured in a simple manner at the very place where it is to be used, the transport costs are reduced considerably. Thus the straight profile strip 26 occupies but about 1/5 of the space necessary for transporting a finished annular mould portion and/or protective element 12 and as a result the straight profiled strip can be transported for about 1/5 of the transport costs of the finished mould portion and/or protective element.

FIG. 6 illustrates the mould portion and/or protective element 12 according to the invention removed from the shaping device. As will appear from FIG. 6 the mould portion and/or protective element 12 is a ring which is slit at one point 51 and which is enclosed at its outer periphery by the tape 36. At slit point 51 the tape extends up to the inner side of the ring in order here to form a gripping portion 53.

The mould portion and/or protective element 12 is utilized in the manner illustrated in FIG. 7 for the moulding of the concrete pipe partly illustrated in FIG. 1. The concrete pipe is moulded with the aid of a mould which in conventional manner consists of two concentric mould portions 52 and 54 for the moulding of the outer and inner surfaces of the pipe wall, and a bottom ring 56 for the moulding of the inner surface of the socket portion of the pipe and the end surface of said socket. Before the concrete is poured into the mould formed there are applied against the bottom ring 56 on one hand the sealing ring 6 of rubber or rubber elastic material and on the other hand the mould portion and/or protective element 12 as described in the foregoing. The sealing ring 6 is first tensioned at the upper end of the bottom ring 56 under a tensioning degree of 3-4% and then the mould portion and/or protective element 12 is pushed down over the bottom ring 56 from above while pushing before itself a sealing ring 6 into the final position shown in FIG. 6. By the above described manufacturing method the mould portion and/or protective element 12 has been given so exact tolerances that it presents a tensioning degree on the bottom ring 56 which preferably amounts to ½-1%. Although the cellular plastics material in the mould portion and/or protective element 12 is relatively brittle there do not arise any cracks therein at the tensioning of said portion or element since the tape 36 constitutes an outer elastic reinforcement around the mould portion and/or protective element 12. By the described tensioning of both the sealing ring and the mould portion and/or protective element 12 there are obtained extremely small tolerances in the subsequent moulding of the pipe and moreover an absolutely tight connection between the mould portion and/or protective element 12 and the bottom ring 56 is obtained, preventing leakage of concrete between the mould portion and/or protective element 12 and the bottom ring 56 in the moulding operation. When the concrete is poured into the mould the fastening portion 8 protruding from the sealing ring 6 will be fixedly embedded in the concrete, while the sealing ring 6 and the mould portion and/or protective element 12 will mould the majority of the inner surface of the socket portion 4 of the pipe. At the conventional vibration of the concrete to increase the strength thereof the tape 36 will provide such a reinforcement of the mould portion and/or protective element 12 that the material thereof which is relatively sensitive to such stresses, will be kept intact. After the concrete has hardened the concrete pipe is removed from the mould portions 52 and 54 and the bottom ring 56, while the sealing ring 6 and the mould portion and/or protective element 12 are allowed to remain in the socket portion 4 of the pipe.

When the concrete pipe is joined to another pipe the mould portion and/or protective element 12 is removed by tearing with the aid of the tape 36 which is gripped at its gripping portion 53 positioned at the inner side of the mould portion and/or protective element 12.

It will be appreciated that the mould portion and/or protective element 12 can be manufactured also in a manner other than that described by way of example with reference to FIGS. 2-5. As shown in FIG. 8, the mould portion and/or protective element 12 can be made from two blanks 12 and 12a of semi-circular shape, which are cut off at their end portions to form together an annular mould portion and/or protective element of the desired diameter, said blanks being but together after the cutting off of the end portions in order to form the mould portion and/or protective element. Also a mould portion and/or protective element manufactured in this way is preferably provided with a reinforcing element in the form of a tape which extends all around it.

It will be realized that the method and device according to the present invention are well suited for the manufacture of protective elements only. In this case the protective elements are so dimensioned that they will be pressed under a certain elastic deformation into engagement with the surfaces to be protected so that rain and soil are effectively prevented from getting into touch with the surfaces.

When manufacturing a circular mould portion and/or protective element having a small diameter it can be suitable to modify the shaping device according to FIG. 4 in such a way that the shaping element is of eliptic shape. Thereby, the parts and elements 32-50 of the shaping device are provided at a portion of the shaping element having the greatest diameter, which makes it more easy to position the ends of the profile strip opposite to each other in the final stage of the shaping.

The invention can also be modified in other respects within the scope of the appended claims.

We claim:

1. A method of manufacturing a combination mould portion and protective element from a flat cut blank of thermoplastic material having first and second opposite surfaces to protect therewith surfaces of an article adapted to be connected to another article, comprising the steps of:
   (a) positioning the flat cut blank on a guide bar between a pair of drive and driven rollers;
   (b) positioning an end of an adhesive coated tape strip so that it extends across the feed path of said blank;
   (c) driving the blank with the drive roller so that an end of said blank adhesively contacts the tape strip, the end of said tape strip projecting outwardly from the first surface of the blank while a remaining part of the tape strip is located facing the second surface;
(d) guiding the blank along an arcuate guide surface with the drive roller so that the blank is progressively formed into an annular element with the first surface being an outer peripheral surface thereof and said second surface being an inner peripheral surface thereof with opposite ends of said blank located facing and adjacent each other to define a joint or slit through which said end of said tape strip passes; and
(e) progressively supplying the remaining portion of said tape strip into overlapping adhesive contact with the outer peripheral surface including the joint.

2. A method as claimed in claim 1, wherein the blank is a profile strip cut to a predetermined length and given an annular shape by being fed into and driven around the inner periphery of an annular shaping element.

3. A method as claimed in anyone of claims 1, wherein the mould portion and/or protective element before moulding of the article are engaged with a supporting portion in the mould.

4. A method as claimed in claim 3, wherein the mould portion and/or protective element is so dimensioned in relation to the supporting portion that said mould portion and/or protective element when engaged with said supporting portion, undergoes an elastic deformation.

5. The method of claim 1, comprising the further step of cutting off a mould portion blank formed by an elongate profile strip into a predetermined length to obtain said flat cut blank prior to positioning said blank on the guide bar.

6. A method of manufacturing a combination mould portion and protective element from a flat cut blank material subject to dimensional changes and using said element to protect and form joint surfaces formed in a socket portion of a concrete pipe adapted to be connected to another pipe, comprising the steps of:
(a) transporting at least one said flat cut blank to a site where said concrete pipe is to be poured;
(b) forming at least one of said blanks into an annular shaped element by progressively feeding said blank along an inner annular peripheral surface of an annular shaping device;
(c) positioning the annular shaped mould portion element in relation to a pair of side mould portions and a bottom ring mould portion to define therewith a cavity forming said socket portion of the pipe;
(d) pouring concrete into the cavity to form the socket portion, said annular shaped mould portion element defining inner surfaces of the socket portion adapted to sealingly connect with another pipe; and
(e) removing the side mould portions and bottom ring mould portion after the concrete has hardened, said annular shaped element being left intact in tight fitting engagement to protect inner surfaces of said socket portion against contact with water or soil during transportation and storage of said pipe.

7. A method as claimed in claim 6, wherein the blank is an elongate profile strip which at the manufacture of the mould portion and/or protective element is cut to the predetermined length.

8. A method as claimed in claim 6, wherein the profile strip cut to the predetermined length and given annular shape is peripherally enclosed by means of a tape-shaped element.

9. A method as claimed in claim 8, wherein the tape-shaped element is continuously supplied to the outer peripheral surface of the profile strip during the feed thereof into the shaping element.

10. A method as claimed in claim 6, wherein a pair of blanks are formed into semicircular shape and joined together with tape so that opposite ends of one blank abut opposite ends of the other blank to form said annular mould portion and/or protective element.

11. A method as claimed in claim 10, wherein the blanks put together to an annular mould portion and/or protective element are peripherally enclosed by means of a tape-shaped element.

12. A method as claimed in claim 6, wherein the mould portion and/or protective element is manufactured of cellular plastics.

13. A method as claimed in claim 6, wherein the mould portion and/or protective element consisting of cellular plastics is enclosed by means of tape.

14. A method of manufacturing and using a combination mould portion and protective element from a flat cut blank formed of styrene cellular plastic material to protect therewith inner sealing surfaces of a socket portion of an article adapted to mate with another article in sealing contact, comprising the steps of:
(a) positioning the flat cut blank on a guide surface between a pair of drive and driven rollers;
(b) guiding the blank along an arcuate guide surface with the drive roller so that the blank is progressively formed into an annular element having an outer peripheral surface and an inner peripheral surface;
(c) taping abutting ends of said annular element together so that said annular element retains its shape;
(d) forming said socket portion immediately after shaping said annular element by positioning the annular shaped mould portion element in relation to a pair of side mould portions and a bottom ring mould portion to define therewith a cavity forming said socket portion of the pipe into which cavity a material is poured to form said socket portion; and
(e) removing the side mould portions and bottom ring mould portion after the material has hardened, said annular shaped element being left intact in tight fitting engagement to protect inner surfaces of said socket portion against contact with water or soil during transportation and storage of said pipe.

15. A combination mould portion and protective element used for forming and protecting surfaces of an article during transportation and storage thereof, said surfaces of said article being adapted to be sealed to another article, comprising:
(a) an annular element formed from at least one flat cut blank bent into an annular shape, said annular element having an inner periphery and an outer periphery, the outer periphery being engageable to protect said surfaces of said article, said annular element further including abutting edges formed by opposite ends of the bent blank that establish at least one slit defined between said opposite ends of said blank, the slit extending substantially entirely through the element in the axial direction thereof; and
(b) tape means extending around the entire periphery of said annular element and across said slit to maintain the annular shape of the element and connect said abutting edges together, said tape means including a gripping portion extending radially inward through the slit, said gripping portion extending inward from the inner periphery so as to be manually engageable to easily remove the annular element from said article surfaces.

16. A mould portion and/or protective element as claimed in claim 15, wherein said mould portion and/or protective element is dimensioned in relation to the supporting surface of said article so that it undergoes a weak elastic deformation when it is joined to the supporting surface.

17. The combination mould portion and protective element of claim 15, wherein said annular element is formed from plural curved sections connected together by said tape means.

18. The combination mould portion and protective element of claim 15, wherein said flat cut blank is made of a cellular plastic material being elastically deformable and tensioned a predetermined amount to elastically mould into tightening sealing contact with said article surfaces.

19. The combination mould portion and protective element of claim 15, wherein said annular element is formed from a flat cut blank made of styrene cellular plastics that is dimensionally unstable.

20. The combination mould portion and protective element of claim 15, wherein said article is a concrete pipe including a socket portion having said surfaces.

21. A combination mould portion and protective element as set forth in claim 20, wherein said annular element is formed from a plurality of blanks each having edges abutting edges of adjacent blanks, said blanks being joined by said tape means to establish said annular element.

22. A device for shaping a generally flat cut, elongated blank into an annular protective element used to mould sealing surfaces of an article and protect same during transportation and storage thereof, comprising:
  (a) a shaping element having an annular inner peripheral shaping surface;
  (b) a guide bar having a guide surface in tangential alignment with a point on the peripheral surface;
  (c) a drive roller and driven roller positioned to contact the blank placed therebetween on the guide surface to drive the blank along the shaping surface, thereby forming the blank into an annular shaped element having an inner peripheral surface and an outer peripheral surface in contact with the shaping surface; and
  (d) tape supply means for supplying a tape-shaped element to the outer periphery of the mould portion and/or protective element while it is driven along the shaping surface, said tape connecting abutting ends of said annular element together.

23. The device of claim 22, further including guide roller means rotatably mounted opposite the guide surface by an adjustable distance downstream from the drive roller to contact the blank and positively guide same into shaping engagement with the peripheral shaping surface.

24. The device of claim 22, further including a recess or slot formed in the guide bar in communication with the guide surface so that a leading edge of the tape extends therethrough to contact the leading edge of the blank, said tape leading edge thereby being positioned radially inward from the inner peripheral surface of the blank formed into said annular shaped element.

25. The device of claim 22, further including a crank fixed to the drive roller, said crank manually engageable to drive the blank into the shaping element.

26. The device of claim 25, wherein said driven roller is spring biassed towards the drive roller to frictionally contact an outer surface of the blank while the drive roller frictionally contacts the inner surface of said blank.

* * * * *